Jan. 26, 1954
J. R. HOLLINS
2,667,603
VEHICLE DIRECTIONAL AND EMERGENCY
PARKING SIGNAL CONTROL SYSTEM
Filed Dec. 1, 1951
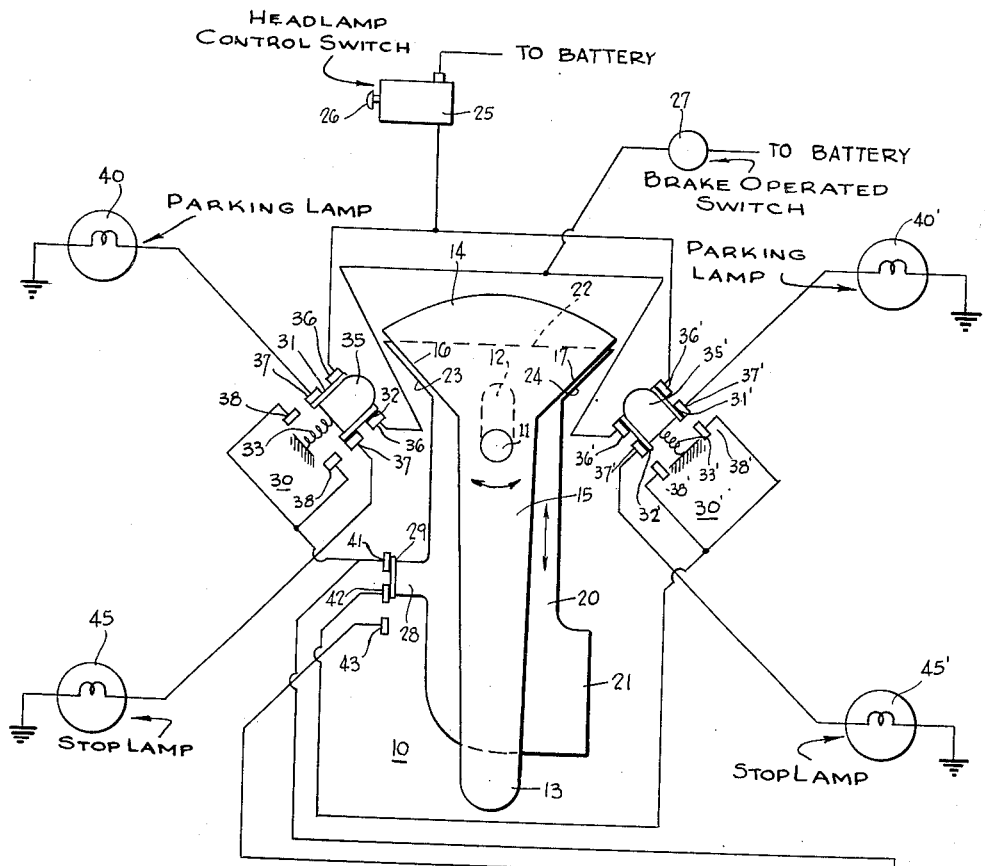
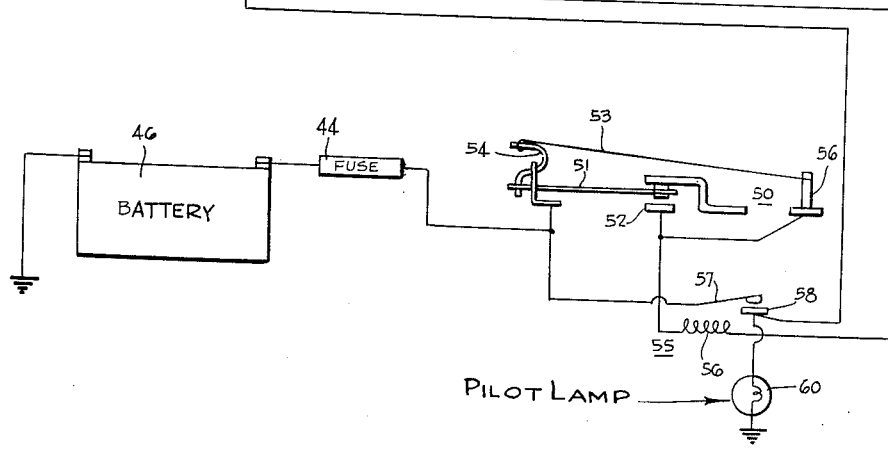
INVENTOR.
Jesse R. Hollins
BY
ATTORNEY Patented Jan. 26, 1954

2,667,603

UNITED STATES PATENT OFFICE 2,667,603

VEHICLE DIRECTIONAL AND EMERGENCY PARKING SIGNAL CONTROL SYSTEM

Jesse R. Hollins, Brooklyn, N. Y.

Application December 1, 1951, Serial No. 259,473

7 Claims. (Cl. 315—80)

This invention relates to signal lamp circuits for motor vehicles and, more particularly, to a novel directional signalling switch in combination with novel signal lamp and flasher circuits.

Modern motor vehicles are equipped with two pairs of lamps for signalling changes in direction, one pair being mounted on either side of the front of the vehicle and the other pair on either side of the rear of the vehicle. A selector switch is provided to selectively energize both left lamps or both right lamps, preferably in circuit with a flasher to "flash" the selectively illuminated lamps. Frequently, the parking and tail lamps of the vehicle are used as the signal lamps.

The flasher generally includes a resistance wire which is always in circuit and which is periodically shunted by operation of a movable switch arm responsive to heating of the resistance wire. This arm makes alternate contacts with two terminals. When the resistance wire is not shunted, its high resistance prevents any effective current flow to the signal lamps, so that the lamps are energized only when the resistance wire is shunted by the movable flasher arm. When the latter shunts the resistance wire, the wire cools and the flasher arm disengages the shunting contact. An indicating pilot lamp is usually associated with the signal lamps and energized through a relay which closes its contacts each time the lamps are energized by the flasher.

The signalling lamps on either side of the vehicle are selectively energized, in the usual case, by a swinging selector lever. When separate signal lamps are provided, a switch operated by this lever connects the selected lamps (right or left) to the source of electric energy through the flasher. When the parking and tail or stop lamps double as the signal lamps, the switch normally connects these lamps to respective switches. When the selector lever is operated, the switch disconnects the selected lamps from their control switches and connects them to the battery through the flasher. In either case, a flashing "right turn" or "left turn" signal is provided.

In accordance with the present invention, a novel signalling control arrangement is provided including a swingable selector arm for selectively signalling a turn and an additional "flare" arm for simultaneously flashing all the signal lamps either in synchronism or in alternation. As the load of all the lamps, if imposed simultaneously on the flasher, would overload the flasher contacts and shorten its life, the invention control includes a novel circuit arrangement whereby the signal lamp load is divided into two equal parts, only one of which draws its current through the main flasher contacts. Thus, even with all lamps being flashed at once, the flasher contacts carry only their normal design load.

For an understanding of the invention principles, reference is made to the following detailed description of typical embodiments thereof as illustrated in the accompanying drawing. In the drawing, the single figure is a schematic wiring diagram of a vehicle signal lamp circuit embodying the invention control arrangement.

Referring to the drawing, the invention is illustrated, by way of example only, as incorporated in a signalling system of the type in which the vehicle parking and stop lamps are also used as turn signalling lamps. The control switch 10, which in practice is mounted on a suitable base or enclosed in a suitable housing, is provided with a swingably mounted selector lever 15 controlling the turn signalling and a reciprocably mounted "flare" lever 20 operable to flash all the signal lamps at once.

Lever 15 may be swingably mounted on a pivot pin or shaft 11, which also extends through an elongated slot 12 in lever 20 permitting longitudinal reciprocation of the latter. Lever 15 includes an elongated operating handle 13 and an enlarged switch operating head 14 which is preferably substantially sector shaped about pin 11 as a center and includes switch operating or camming surfaces 16 and 17.

Lever 20 may be normally spring biased to the position shown, or may be merely releasably latched in either extreme position. This lever has a lateral offset 21 at its lower end which may be grasped by the operator to operate the "flare" control. At its opposite end, lever 20 has a substantially triangular operating head 22 with switch operating or camming surfaces 23, 24 substantially parallel, respectively, to surfaces 16 and 17 of lever 15.

On either side of levers 20 and 15 are the signalling control switches 30 and 30', which are identical in construction so that only one will be described in detail. Switch 30 includes a longitudinally reciprocable operator 35 aligned for movement perpendicularly to surface 23 of head 22 and carrying contact strips 31, 32 on either side. A spring 33 biases operator 35 toward surfaces 16 and 23. Three pairs of contacts 36, 37 and 38 are arranged for selective interconnection by contact strips 31, 32.

One outer contact 36, 36' of each switch is connected to headlamp control switch 25 which, in turn, is connected to the vehicle battery and generator. When the operating knob 26 of switch 25 is in the "parking lamps" position, these two switch contacts 36, 36' are "live." The other outer contacts 36, 36' are connected in parallel to the stop light switch 27 which is usually brake pedal operated and is connected to the battery and generator.

One of each pair of intermediate contacts 37, 37' is connected to a different grounded parking lamp 40 (left) or 40' (right). Each other intermediate contact 37, 37' is connected to a different grounded stop lamp 45 (left) or 45' (right).

An abutment 28 on one side of "flare" lever 20 carries a contact strip 29 cooperable with three contacts 41, 42, 43. Contact 41 is connected in parallel to innermost contacts 38, 38, and contact 42 to innermost contacts 38', 38'. Contacts 41 and 43 are individually connected, in a novel manner, to a flasher 50 connected through a fuse 44 to the grounded vehicle battery 46 (which is in parallel with the vehicle generator).

The flasher 50 has a movable contact arm 51 which is normally biased out of engagement with a main flasher contact 52 by means including a high resistance wire 53. Wire 53 is connected between flasher terminals 54 and 56, terminal 54 being connected to fuse 44, and terminal 56 to main contact 52. The latter is connected, in series, with the operating coil 56 of a pilot lamp relay 55, to contact 41. The arm 57 of relay 55 is normally disengaged from a relay contact 58 connected to a grounded pilot or indicator lamp 60.

For a purpose to be described, contact 58 is also connected to switch contact 43. Relay arm 57 is connected to terminal 54, and thus to fuse 44 in parallel with resistance wire 53. It will be noted that, when the lamps 40, 45 and/or 40', 45' are connected in circuit, the current flows through wire 53, arm 51 being disengaged from contact 52. The resistance of wire 53 is so high that the lamps do not receive sufficient current to be lighted. As wire 53 heats, it lengthens and arm 51 snaps into engagement with contact 52 lighting the lamps and energizing relay coil 56 to engage arm 57 with contact 58 to light lamp 60. Wire 53, being thus shunted, cools and contracts to disengage arm 51 from main contact 52, extinguishing the signal and pilot lamps. This operation is cyclically repeated to flash the lamps.

In the switch position shown in the drawing, the parking lamps are connected to headlamp control switch 25 through contacts 36, 37 and strip 31, and contacts 36', 37' and strip 31'. Similarly, the stop lamps are connected to switch 27 through the outer and intermediate contacts engaged by strips 32, 32'.

To signal a left turn, selector lever 15 is swung counterclockwise so that surface 16 of head 15 engages operator 35 and moves it inwardly to disengage contacts 36 and connect contacts 37 to contacts 38. Lamps 40, 45 are now connected to flasher 50 through contacts 37, strips 31, 32, 38, contact 41, relay coil 56 and main contact 52. The left lamps 40, 45 are thus flashed in synchronism with pilot lamp 60. The right lamps 40', 45' may be similarly flashed by swinging lever 15 clockwise, the contacts 38, 38' being connected to contact 41 through contact 42 and strip 29.

To flash all the lamps at once as warning "flares" for an emergency stop or parking, lever 20 is pulled by grasping abutment 21. Strip 29 disconnects contact 42 from contact 41 and interconnects contacts 42 and 43. Surfaces 23 and 24 on head 22 move operators 35, 35' to disengage the outer pair of contacts 36, 36' and connect the intermediate contacts 37, 37' to the corresponding inner contacts 38, 38'. Lamps 40 and 45 are again connected to flasher 50 through contact 41 as previously described, and flash in synchronism with lamp 60.

However, if all the lamps were energized through main contact 52, this contact and arm 51 would be overloaded, tending to shorten the life of flasher 50. Such overloading is avoided by energizing the right lamps 40', 45' through relay contact 58 thus shunting arm 51 and main contact 52. Lamps 40' and 45' are connected to fuse 44 through contacts 37', strips 31', 32', contacts 38', contact 42, contact 43, relay contact 58 and relay arm 57. These lamps thus flash simultaneously with the left lamps and lamp 60, as relay 55 closes each time the flasher lights lamps 40 and 45.

Thus, the invention arrangement provides for normal operation of the parking and stop lamps, for selective flashing of either the right or left lamps, and for simultaneous flashing of all of the lamps, the latter being effected without overloading the flasher through connecting one set of lamps through the flasher relay.

Should independent signal lamps be provided, the described and illustrated arrangement is modified by omitting the circuit connections to headlamp control switch 25 and stop lamp switch 27, otherwise operating exactly as described herein.

While a specific embodiment of the invention has been shown and described in detail to illustrate the application of the invention principles thereof, it should be understood that the invention may be otherwise embodied without departing from such principles.

What is claimed is:

1. A motor vehicle signalling control, comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source and having a main, normally open contact; a relay associated with said flasher and operable when said main contact is closed; said relay having an armature and a front contact normally disengaged by said armature; a grounded indicator lamp connected to said front contact; means connecting said armature to said energy source in shunt with said flasher; a selector lever movably mounted between said switches and operable to selectively engage either switch operator to move the same to said second position; a flare lever movably mounted between said switches and selectively operable to engage both switch operators simultaneously to move both thereof to said second position; and switch means associated with and operable by said flare lever and connected to each of said second pairs of contacts, said flasher main contact in series with the operating coil of said relay, and to said relay front contact; said switch means, in the non-operated position of said flare lever, connecting both of said second pairs of contacts to said flasher main contact and, in the selectively operated position of said flare lever, connecting one pair of second contacts to said main contact and the other pair of second contacts to said front contact; whereby, when said selector lever is selectively operated, the signal lamps on one side of the vehicle will be flashed through said main contact, and when said flare lever is selectively operated, the signal lamps on one side of the vehicle will be flashed through said main contact and the signal lamps on the other side of the vehicle will be flashed through said front contact; said pilot lamp being flashed by said relay whenever either or both sets of signal lamps are flashed.

2. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source and having a main, normally open contact; a relay associated with said flasher and operable when said main contact is closed; said relay having an armature and a front contact normally disengaged by said armature; a grounded indicator lamp connected to said front contact; means connecting said armature to said energy source in shunt with said flasher; a selector lever swingably mounted on a pivot intermediate said switches and operable to selectively engage either switch operator to move the same to said second position; a flare lever mounted for reciprocation in alignment with said pivot and intermediate said switches and selectively operable to engage both switch operators simultaneously to move both thereof to said second position; and switch means associated with and operable by said flare lever and connected to each of said second pairs of contacts, said flasher main contact in series with the operating coil of said relay, and to said relay front contact; said switch means, in the non-operated position of said flare lever, connecting both of said second pairs of contacts to said flasher main contact and, in the selectively operated position of said flare lever, connecting one pair of second contacts to said main contact and the other pair of second contacts to said front contact; whereby, when said selector lever is selectively operated, the signal lamps on one side of the vehicle will be flashed through said main contact, and when said flare lever is selectively operated, the signal lamps on one side of the vehicle will be flashed through said main contact and the signal lamps on the other side of the vehicle will be flashed through said front contact; said pilot lamp being flashed by said relay whenever either or both sets of signal lamps are flashed.

3. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source and having a main, normally open contact; a relay associated with said flasher and operable when said main contact is closed; said relay having an armature and a front contact normally disengaged by said armature; a grounded indicator lamp connected to said front contact; means connecting said armature to said energy source in shunt with said flasher; a selector lever swingably mounted on a pivot intermediate said switches and including an operating handle and a head having camming surfaces selectively engageable with either switch operator to move the same to said second position; a flare lever mounted for reciprocation in alignment with said pivot and intermediate said switches and including a head having camming surfaces aligned with said operators, said flare lever being selectively operable to engage both its camming surfaces simultaneously with said operators to move both operators to said second position; and switch means associated with and operable by said flare lever and connected to each of said second pairs of contacts, said flasher main contact in series with the operating coil of said relay, and to said relay front contact; said switch means, in the non-operated position of said flare lever, connecting both of said second pairs of contacts to said flasher main contact and, in the selectively operated position of said flare lever, connecting one pair of second contacts to said main contact and the other pair of second contacts to said front contact; whereby, when said selector lever is selectively operated, the signal lamps on one side of the vehicle will be flashed through said main contact, and when said flare lever is selectively operated, the signal lamps on one side of the vehicle will be flashed through said main contact and the signal lamps on the other side of the vehicle will be flashed through said front contact; said pilot lamp being flashed by said relay whenever either or both sets of signal lamps are flashed.

4. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source and having a main, normally open contact; a relay associated with said flasher and operable when said main contact is closed; said relay having an armature and a front contact normally disengaged by said armature; a grounded indicator lamp connected to said front contact; means connecting said armature to said energy source in shunt with said flasher; a selector lever movably mounted between said switches and operable to selectively engage either switch operator to move the same to said second position; a flare lever movably mounted between said switches and selectively operable to engage both switch operators simultaneously to move both thereof to said second position; and a contact strip extending along said flare lever parallel to the latter's direction of reciprocation, and selectively engageable with first, second and third aligned contacts, said strip normally interconnecting said first and second contacts and, in the selectively operated position of said flare lever, interconnecting only said second and third contacts; said first contact being connected in parallel to the second pair of contacts of one switch and to said main flasher contact in series with the relay operating coil, said second contact being connected to the second pair of contacts of the other switch, and said third contact being connected to said relay front contact; whereby, when said selector lever is selectively operated, the signal lamps on one side of the vehicle will be flashed through said main contact and, when said flare lever is selectively operated, the signal lamps on one side of the vehicle will be flashed through said main contact and the signal lamps on the other side of the vehicle will be flashed through said front contact; said pilot lamps being flashed by said relay whenever either or both sets of signal lamps are flashed.

5. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source and having a main, normally open contact; a relay associated with said flasher and operable when said main contact is closed; said relay having an armature and a front contact normally disengaged by said armature; a grounded indicator lamp connected to said front contact; means connecting said armature to said energy source in shunt with said flasher; a selector lever swingably mounted on a pivot intermediate said switches and operable to selectively engage either switch operator to move the same to said second position; a flare lever mounted for reciprocation in alignment with said pivot and intermediate said switches and selectively operable to engage both switch operators simultaneously to move both thereof to said second position; and a contact strip extending along said flare lever parallel to the latter's direction of reciprocation, and selectively engageable with first, second and third aligned contacts, said strip normally interconnecting said first and second contacts and, in the selectively operated position of said flare lever, interconnecting only said second and third contacts; said first contact being connected in parallel to the second pair of contacts of one switch and to said main flasher contact in series with the relay operating coil, said second contact being connected to the second pair of contacts of the other switch, and said third contact being connected to said relay front contact; whereby, when said selector lever is selectively operated, the signal lamps on one side of the vehicle will be flashed through said main contact and, when said flare lever is selectively operated, the signal lamps on one side of the vehicle will be flashed through said main contact and the signal lamps on the other side of the vehicle will be flashed through said front contact; said pilot lamps being flashed by said relay whenever either or both sets of signal lamps are flashed.

6. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source and having a main, normally open contact; a relay associated with said flasher and operable when said main contact is closed; said relay having an armature and a front contact normally disengaged by said armature; a grounded indicator lamp connected to said front contact; means connecting said armature to said energy source in shunt with said flasher; a selector lever swingably mounted on a pivot intermediate said switches and including an operating handle and a head having camming surfaces selectively engageable with either switch operator to move the same to said second position; a flare lever mounted for reciprocation in alignment with said pivot and intermediate said switches and including a head having camming surfaces aligned with said operators, said flare lever being selectively operable to engage both its camming surfaces simultaneously with said operators to move both operators to said second position; and a contact strip extending along said flare lever parallel to the latter's direction of reciprocation, and selectively engageable with first, second and third aligned contacts, said strip normally interconnecting said first and second contacts and, in the selectively operated position of said flare lever, interconnecting only said second and third contacts; said first contact being connected in parallel to the second pair of contacts of one switch and to said main flasher contact in series with the relay operating coil, said second contact being connected to the second pair of contacts of the other switch, and said third contact being connected to said relay front contact; whereby, when said selector lever is selectively operated, the signal lamps on one side of the vehicle will be flashed through said main contact and, when said flare lever is selectively operated, the signal lamps on one side of the vehicle will be flashed through said main contact and the signal lamps on the other side of the vehicle will be flashed through said front contact; said pilot lamps being flashed by said relay whenever either or both sets of signal lamps are flashed.

7. A motor vehicle signalling control comprising a pair of switches mounted in spaced relation to each other, each switch including a first pair of contacts respectively connected to a front and a rear marker lamp on one side of the vehicle, a second pair of contacts, a third pair of contacts respectively connected to a head lamp control switch and a brake operated switch, and an operator normally engaged with said first and third pairs of contacts and movable to a second position interconnecting each of the first pair of contacts to a corresponding contact of the second pair; a flasher conected to the vehicle electric energy source and having a main, normally open contact; a relay associated with said flasher and operable when said main contact is closed, said relay having an armature and a front contact normally disengaged by said armature; a grounded indicator lamp connected to said front contact; means connecting said armature to said energy source in shunt with said flasher; a selector lever movably mounted between said switches and operable to selectively engage either switch operator to move the same to said second position; a flare lever movably mounted between said switches and selectively operable to engage both switch operators simultaneously to move both thereof to said second position; and switch means associated with and operable by said flare lever and connected to each of said second pairs of contacts, said flasher main contact in series with the operating coil of said relay, and to said relay front contact; said switch means, in the non-operated position of said flare lever, connecting both of said second pairs of contacts to said flasher main contact and, in the selectively operated position of said flare lever, connecting one pair of second contacts to said main contact and the other pair of second contacts to said front contact; whereby, when said selector lever is selectively operated, the signal lamps on one side of the vehicle will be flashed through said main contact, and when said flare lever is selectively operated, the signal lamps on one side of the vehicle will be flashed through said main contact and the signal lamps on the other side of the vehicle will be flashed through said front contact; said pilot lamp being flashed by said relay whenever either or both sets of signal lamps are flashed; said first named switches, in the non-operated positions of both levers, connecting the front lamps to the head lamp control switch and the rear lamps to the brake operated switch.

JESSE R. HOLLINS.

References Cited in the file of this patent

UNITED STATES PATENTS

| Number | Name | Date |
| --- | --- | --- |
| 2,090,332 | O'Neil | Aug. 17, 1937 |
| 2,514,604 | Hollins | July 11, 1950 |
| 2,562,274 | Hollins | July 31, 1951 |
| 2,562,275 | Hollins | July 31, 1951 |